United States Patent
Abbott et al.

(10) Patent No.: US 9,649,911 B2
(45) Date of Patent: May 16, 2017

(54) SINGLE POINT COMMUNICATION SCHEME FOR A TRANSPORT REFRIGERATION SYSTEM

(71) Applicant: THERMO KING CORPORATION, Minneapolis, MN (US)

(72) Inventors: Philip Morgan Abbott, Minneapolis, MN (US); Stanley O. Hoium, West St. Paul, MN (US); Nathan Patrick Longen, Mahtomedi, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 14/897,549

(22) PCT Filed: Jun. 10, 2014

(86) PCT No.: PCT/US2014/041694
§ 371 (c)(1),
(2) Date: Dec. 10, 2015

(87) PCT Pub. No.: WO2014/200990
PCT Pub. Date: Dec. 18, 2014

(65) Prior Publication Data
US 2016/0137033 A1    May 19, 2016

Related U.S. Application Data

(60) Provisional application No. 61/833,291, filed on Jun. 10, 2013.

(51) Int. Cl.
*H04B 7/00* (2006.01)
*B60H 1/32* (2006.01)
(Continued)

(52) U.S. Cl.
CPC ......... *B60H 1/3232* (2013.01); *F25D 11/003* (2013.01); *F25D 29/003* (2013.01);
(Continued)

(58) Field of Classification Search
CPC .... H04W 84/18; H04W 88/06; H04M 1/7253
(Continued)

(56) References Cited

U.S. PATENT DOCUMENTS 6,863,222 B2 * 3/2005 Slifkin .................... F25D 29/00
236/51
7,921,659 B2 * 4/2011 Quesada Saborio B60H 1/3232
62/239

(Continued)

FOREIGN PATENT DOCUMENTS

CN        1585878     2/2005
CN      102331754     1/2012
(Continued)

OTHER PUBLICATIONS

Chinese Office Action issued in corresponding Chinese Application No. 201480033253.7 dated Jun. 22, 2016.
(Continued)

*Primary Examiner* — April G. Gonzales
(74) *Attorney, Agent, or Firm* — Hamre, Schumann, Mueller & Larson, P.C.

(57) ABSTRACT

The embodiments described herein allow a user device to communicate with one or more components within a TRS via a single point communication scheme. That is, a single point access coordinator of a TRS can be configured to receive a message from a user device via a commercial grade communication link, process the message (e.g., determine which TRS component the message is intended for, determine whether the message is a proper message, unpack the message from a commercial grade communication protocol,
(Continued)

repack the message into a rugged industrial grade communication protocol, etc.) and relay that message to one or more components of the TRS via a rugged industrial grade communication link within the TRS.

17 Claims, 3 Drawing Sheets

(51) Int. Cl.
*F25D 29/00* (2006.01)
*G06Q 10/08* (2012.01)
*F25D 11/00* (2006.01)
*F25B 49/02* (2006.01)

(52) U.S. Cl.
CPC .......... *G06Q 10/0833* (2013.01); *F25B 49/02* (2013.01); *F25B 2600/07* (2013.01); *F25B 2700/1931* (2013.01); *F25B 2700/1933* (2013.01); *F25B 2700/21151* (2013.01); *F25B 2700/21152* (2013.01); *F25B 2700/21172* (2013.01); *F25B 2700/21173* (2013.01)

(58) Field of Classification Search
USPC ........................................................ 455/41.2
See application file for complete search history.

(56) References Cited

U.S. PATENT DOCUMENTS

| | | | | |
|---|---|---|---|---|
| 8,274,379 | B2* | 9/2012 | Flick | B60H 1/00392 |
| | | | | 165/42 |
| 2007/0034095 | A1* | 2/2007 | McDonnell | A61L 2/202 |
| | | | | 99/468 |
| 2009/0052412 | A1* | 2/2009 | Kumar | H04W 36/02 |
| | | | | 370/338 |
| 2009/0293524 | A1* | 12/2009 | Vezina | B65D 88/744 |
| | | | | 62/239 |
| 2010/0050671 | A1* | 3/2010 | Kahn | B60H 1/00378 |
| | | | | 62/190 |
| 2010/0274396 | A1* | 10/2010 | Yang | B60H 1/00385 |
| | | | | 700/278 |
| 2010/0274604 | A1* | 10/2010 | Crilly | G06Q 10/08 |
| | | | | 705/333 |
| 2011/0291828 | A1* | 12/2011 | Walker | G06Q 10/08 |
| | | | | 340/539.27 |
| 2012/0159971 | A1* | 6/2012 | Fink | B60P 3/20 |
| | | | | 62/56 |
| 2012/0167605 | A1* | 7/2012 | Ikemiya | B60H 1/3232 |
| | | | | 62/126 |
| 2013/0000342 | A1* | 1/2013 | Blasko | B60H 1/00428 |
| | | | | 62/235.1 |
| 2013/0061621 | A1* | 3/2013 | Nielsen | B60R 16/0307 |
| | | | | 62/236 |

FOREIGN PATENT DOCUMENTS

| | | |
|---|---|---|
| CN | 102483275 | 5/2012 |
| WO | 03021163 | 3/2003 |

OTHER PUBLICATIONS

International Search Report for International Application No. PCT/US2014/041694 dated Sep. 24, 2014 (3 pages).
Written Opinion for International Application No. PCT/US2014/041694 dated Sep. 24, 2014 (8 pages).

* cited by examiner

SINGLE POINT COMMUNICATION SCHEME FOR A TRANSPORT REFRIGERATION SYSTEM

FIELD

The embodiments disclosed herein relate generally a transport refrigeration system (TRS). More particularly, the embodiments relate to a single point communication scheme for transferring data and/or files between a user device (PCs, smart phones, tablet devices, etc.) and various components in a TRS.

BACKGROUND

Transport refrigeration systems (TRSs) including a TRU are generally used to cool containers, transport units such as trailers, and numerous other types of transport units (TUs). A TRU portion of a TRS may include a compressor, a condenser, a thermo expansion valve, an evaporator and fans and/or blowers to facilitate heat exchange.

In a cooling cycle, a refrigerant is compressed by the compressor and subsequently flows into the condenser. In the condenser, the compressed refrigerant can release heat to the environment. Then the refrigerant can pass through the thermo expansion valve where it can subsequently flow into the evaporator to absorb heat from air in a space desired to be cooled. A fan and/or blower can be used to facilitate heat exchange between the refrigerant and the environment when the refrigerant is in the condenser and the evaporator by creating air flow through the condenser and the evaporator.

SUMMARY

Embodiments described herein are directed to a single point communication scheme for transferring data and/or files between a user device (PCs, smart phones, tablet devices, etc.) and various components of a TRS.

The embodiments described herein allow a user device to communicate with one or more components within a TRS via a single point communication scheme. That is, a single point access coordinator of a TRS can be configured to receive a message from a user device via a commercial grade communication link, process the message (e.g., determine which TRS component the message is intended for, determine whether the message is a proper message, unpack the message from a commercial grade communication protocol, repack the message into a rugged industrial grade communication protocol, etc.) and relay that message to one or more components of the TRS via a rugged industrial grade communication link within the TRS.

Accordingly, a user device external the TRS can communicate with a plurality of TRS components without having to provide each of the TRS components with the hardware and software necessary to communicate via a commercial grade communication link.

Also, the single point communication scheme as described herein can be retrofitted for existing TRSs by updating the software of an existing TRS component (e.g., the TRS controller) that is configured to communicate via a rugged industrial grade communication link and a commercial grade communication link.

DRAWINGS

The foregoing and other features, aspects and advantages of the invention are apparent from the following detailed description taken in conjunction with the accompanying drawings in which like characters represent like parts throughout the drawings, wherein.

While the above-identified drawing figures set forth alternative embodiments, other embodiments are also contemplated, as noted in the discussion. In all cases, this disclosure presents illustrated embodiments by way of representation and not limitation. Numerous other modifications and embodiments can be devised by those skilled in the art which fall within the scope and spirit of the principles of this disclosure.

DETAILED DESCRIPTION

Figure 1:
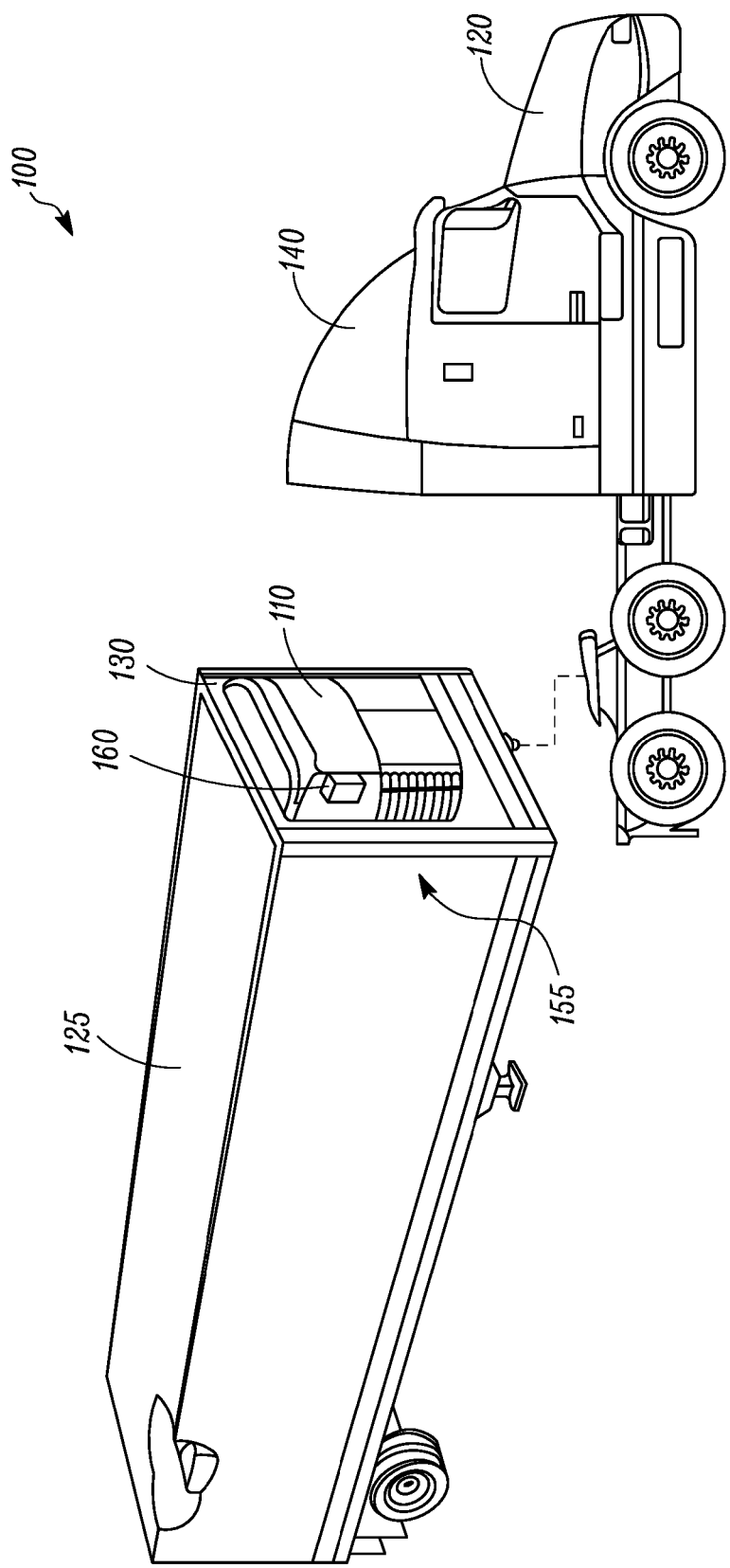
FIG. 1 illustrates one embodiment of a TRS comprising a TRU.

FIG. 1 illustrates one embodiment of a TRS 100 for a transport unit (TU) 125 that is attached to a tractor 120. The TRS 100 includes a TRU 110 that controls refrigeration within the TU 125. The TRU 110 is disposed on a front wall 130 of the TU 125. A tractor 120 is attached to and is configured to tow the transport unit 125. It will be appreciated that the embodiments described herein are not limited to trucks and trailer units, but can just as easily apply to any other suitable TRU 110 includes a programmable TRS controller 155 as a single integrated control unit 160. In some embodiments, the TRS controller 155 may comprise a distributed network of control elements (not shown). The number of distributed control elements in a given network can depend upon the particular application of the principles described herein.

Figure 2:
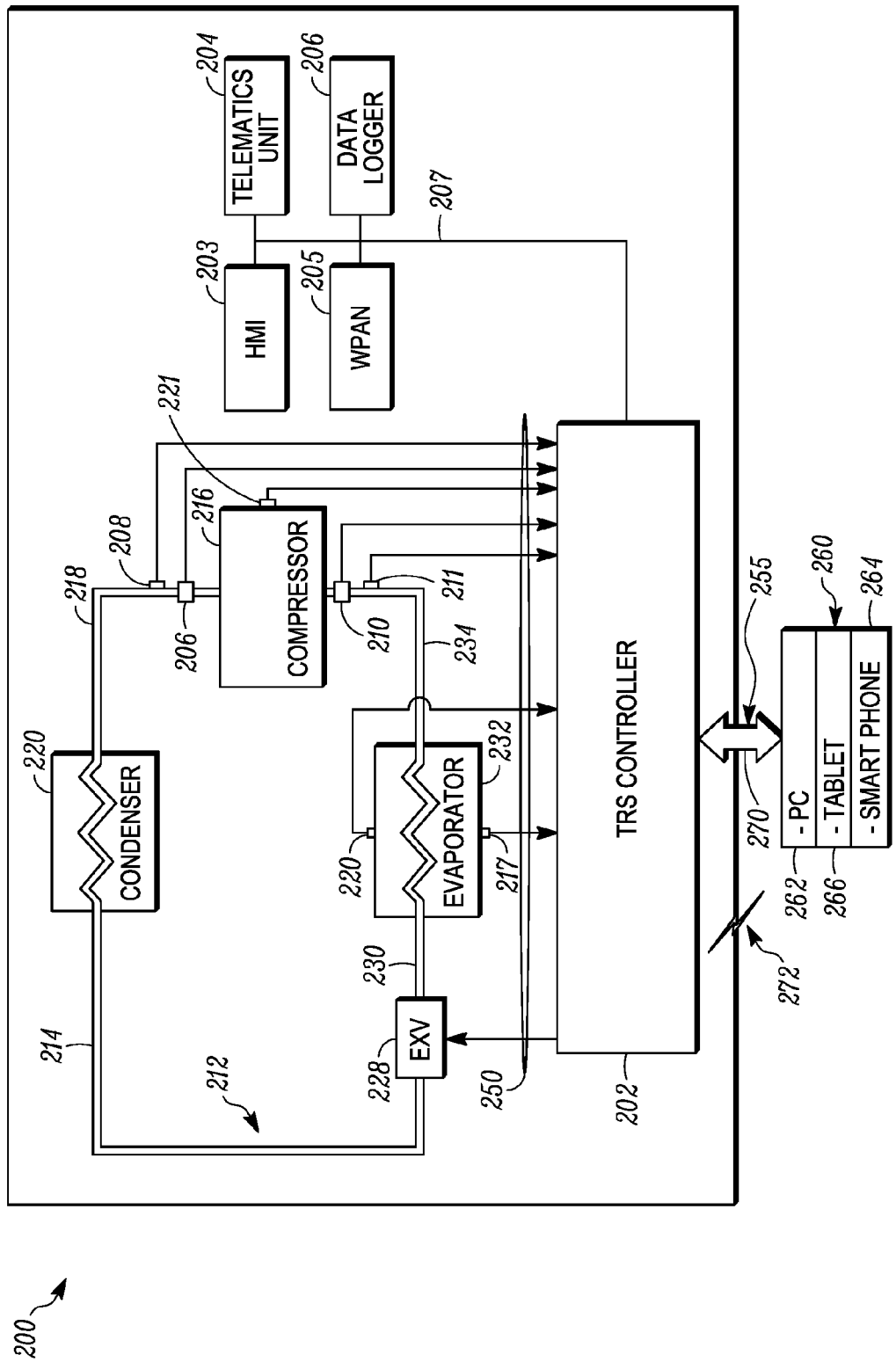
FIG. 2 is a schematic representation of a single point communication system for transferring data and/or files between a user device and various components in a TRS according to one embodiment.

FIG. 2 is a schematic representation of a single point communication system for transferring data and/or files between a user device 260 and various components in a TRS 200. The TRS 200 comprises a refrigeration circuit 212 that generally defines the flow of fluid refrigerant through the TRS 200. A primary fluid path 214 is defined by a compressor 216, a discharge line 218, a condenser 220, a main electronic expansion valve (EXV) 228, and evaporator input line 230, an evaporator 232, and a suction line 234. The compressor 216 is fluidly coupled to the condenser 220 by the discharge line 218. The condenser 220 is fluidly coupled to a main EXV 228. The main EXV 228 is fluidly coupled to the evaporator 232 by the evaporator input line 230. The primary fluid path 214 is completed via fluidic coupling of the evaporator 232 and the compressor 216.

Refrigerant in its various states flows through the primary fluid path 214 of the refrigeration circuit 212 as described herein. Vaporized refrigerant is delivered to the compressor 216 by the suction line 234. The compressor 216 compresses the vaporized refrigerant by increasing its temperature and pressure. The compressed, vaporized refrigerant is then delivered to the condenser 220 by the discharge line 218.

The condenser 220 receives compressed, vaporized refrigerant from the compressor 216. The condenser 220 is a heat exchanger apparatus used to remove heat from the refrigerant in order to condense the vaporized refrigerant into liquid refrigerant. In the condenser 220, the compressed, vaporized refrigerant releases heat to the air in communication with the condenser 220 in order to cool the vaporized refrigerant. The cooling action of the condenser 220 causes the state of the refrigerant to change from vapor to liquid.

While in the fluid path 214, the cool liquid refrigerant is then delivered to the EXV 228. The EXV 228 is a throttling device that restricts the flow of liquid refrigerant by forcing the liquid refrigerant through a small orifice causing the pressure of the liquid refrigerant to decrease, thereby lowering the boiling point of the refrigerant, making the refrigerant evaporate. As the liquid refrigerant passes through the small orifice of the EXV 228, the liquid refrigerant forms into liquid droplets.

The liquid refrigerant droplets are delivered to the evaporator 232 by evaporator input line 230. The liquid refrigerant droplets delivered to the evaporator 232 absorb heat from warm air flowing into the evaporator 232. The evaporator 232 is located within or in thermal communication with the space being conditioned by the transport refrigeration unit 200. Air is generally circulated between the conditioned space and the evaporator 232 by one or more evaporator fans (not shown). Generally, warmer air flows into the evaporator 232, the liquid refrigerant droplets absorb heat from the warmer air, and cooler air flows out of the evaporator 232. The cooler air flowing out of the evaporator 232 cools the masses in the conditioned space by absorbing heat from the masses within the conditioned space; the warmer air is circulated back to the evaporator 232 by the evaporator fans to be cooled again.

The liquid refrigerant droplets vaporize once they have absorbed sufficient heat, i.e. once the liquid refrigerant droplets reach their saturation or vaporization temperature at a given pressure. The refrigerant, which has changed from liquid refrigerant droplets back to vaporized refrigerant, is then delivered by suction line 234 back to the compressor 216. The delivery of the vaporized refrigerant back to the compressor 216 completes the flow of refrigerant through the fluid path 214.

The TRS controller 202 may be programmed to control various TRS 200 components such as, without limitation, the EXV 228, via the rugged industrial grade communication link 250 in response to data provided by, for example, a plurality of sensors that may comprise an evaporator input temperature sensor 217, an evaporator output temperature sensor 220, a suction pressure sensor 210, a compressor discharge pressure sensor 206, a suction temperature sensor 211, a compressor discharge temperature sensor 208, and at least one sensor 221 coupled to the compressor 216. It will be appreciated that numerous additional sensors or fewer sensors may be employed according to the principles described herein based upon a particular application.

In the embodiment shown in FIG. 2, the programmable TRS controller 202 acts as the single point access coordinator that can communicate via the rugged industrial grade communication links 207, 250 and a commercial grade communication link 255. The rugged industrial grade communication links 207, 250 are provided between various components (e.g., components 203-206) associated with the TRS 200 and the programmable TRS controller 202. The rugged industrial grade communication links 207, 250 can be, for example, a Controller Area Network (CAN) connection (e.g., a Jl939 CAN connection), a RS45 connection, or any other rugged industrial grade communication bus that can be relied upon for stable and reliable communication between components in a TRS during transport.

In some embodiments, the industrial grade communication link 207 is a multi-drop communication link that allows for communication between the TRS controller 202, a human-machine interface (HMI) 203, a telematics unit 204, a wireless personal area network (WPAN) 205, a data logger 206, a third party communication device (not shown), etc. This allows for open communication between any of the components 202-206. In other embodiments, the industrial grade communication link 207 can be a master-slave communication link that allows for communication between, for example, the TRS controller 202 (acting as the master) and each of the slaves (e.g., the human-machine interface (HMI) 203, the telematics unit 204, the wireless personal area network (WPAN) coordinator 205 and the data logger 206). Thus, only the component 202-206 designated as the master can communicate with the other components 202-206 designated as the slaves. Also, in some embodiments, the industrial grade communication link 207 can be made up of one or more industrial grade communication buses.

The programmable TRS controller 202 may be programmed to communicate with various user devices 260, such as, without limitation, personal computers (PCs) 262, smart phones 264, tablets 266, and the like, via the suitable commercial grade communication link 255. The commercial grade communication link 255 may comprise for example, a wired communication link 270 such as a USB communication link, or a wireless communication link 272 such as a Wi-Fi data link, an infrared data link, a Bluetooth data link, a Zigbee data link, etc.

By allowing a user device 260 to communication with only one of the components 202-206 (e.g., the TRS controller 202 in FIG. 2) via the commercial grade communication link 255, it becomes unnecessary to provide each of the TRS components with the hardware and software necessary to communicate via a commercial grade communication link. Also, this allows for the single point communication scheme to be retrofitted into existing TRSs by updating the software of an existing TRS component (e.g., the TRS controller) that is already configured to communicate via a rugged industrial grade communication link and a commercial grade communication link. Accordingly, it becomes unnecessary to replace older TRS components that may not have a commercial grade communication link.

Figure 3:
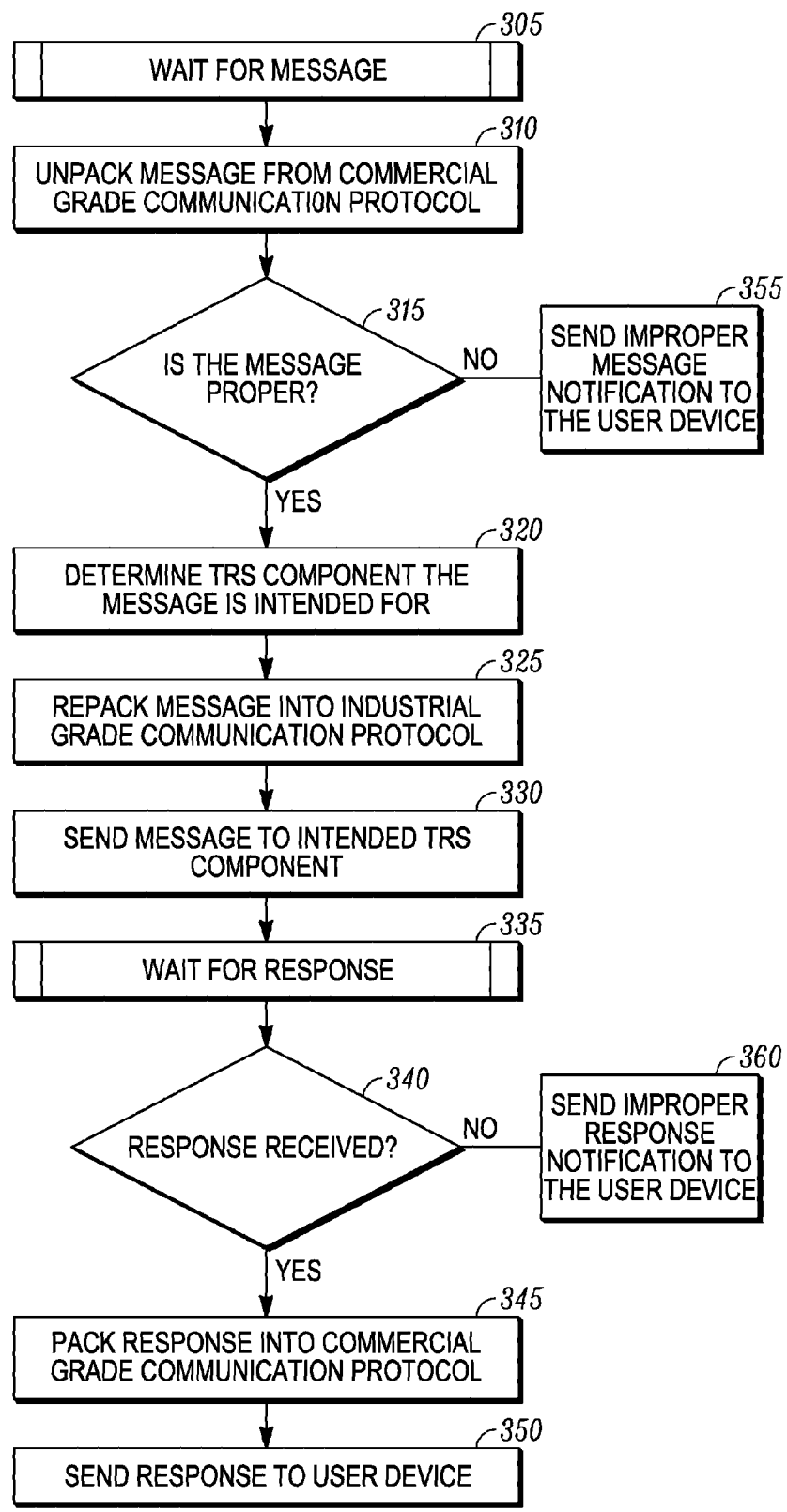
FIG. 3 is a flow chart illustrating a process for communicating data and/or files via a single point communication system, according to one embodiment.

FIG. 3 is a flow chart of a single point communication process 300 for transferring data and/or files between a user device (e.g., the user device 260 in FIG. 2) and various components in a TRS (e.g., the components 202-206 in the TRS 200), according to one embodiment.

In this embodiment, a single point access coordinator is provided for relaying a message from a user device to one or more TRS components (including the single point access coordinator). The single point access coordinator can include a programmable controller that has a data processing unit such as a dedicated DPU or a CPU. The programmable controller can further include an input/output (I/O) module and predetermined memory elements that may comprise volatile and non-volatile RAM, ROM, EPROM, and variants thereof. The I/O module is connected to a rugged industrial grade communication link that allows data communication to take place between the programmable controller and other TRS components. The I/O module is also connected to a commercial grade communication link that allows data communication to take place between the programmable controller and a user device that is external the TRS. Accordingly, the single point access coordinator acts as a coordinator within a distributed communication architecture of rugged industrial grade communication link(s) within the TRS and a commercial grade communication link allowing a user device to communicate with the TRS.

The process 300 begins at 305 where the single point access coordinator of a TRS (e.g., the TRS controller 202 in FIG. 2) waits for a message from a user device (e.g., the user device 260 in FIG. 2) via a commercial grade communication link (e.g., the commercial grade communication link 255 in FIG. 2). When the single point access coordinator receives a message from the user device, the process 300 proceeds to 310.

At 310, the single point access coordinator unpacks the message that was packaged in a commercial grade communication protocol (e.g., Wi-Fi communication, infrared communication, Bluetooth communication, Zigbee communication, or any high-speed, commercially available communication protocl.). A message from the user device prior to being unpacked can include, for example, information as to where the message came from, which TRS component the message is for, the data length of the message and the message itself. The process 300 then proceeds to 315.

At 315, the single point access coordinator determines whether the message is a proper message. The single point access coordinator can determine that the message is not a proper message if, for example, the message is not valid (e.g., the message was not packaged in a required format), the message is corrupt, the content of the message is requesting an action by one of the components of the TRS that the user device does not have permission to request, etc.). If the message is determined to be proper, the process 300 proceeds to 320. If the message is determined to not be proper, the process 300 proceeds to 355.

At 320, the single point access coordinator determines which component of the TRS the message is for. At 325, the single point access coordinator repacks the message in an industrial grade communication protocol for communication via a rugged industrial grade communication link (e.g., a Controller Area Network (CAN) connection (e.g., a J1939 CAN connection), a RS45 connection, or any other rugged industrial grade communication bus). In some embodiments, the industrial grade communication protocol can be a proprietary communication protocol created specifically for use in a TRS. The process 300 then proceeds to 330.

At 330, the single point access coordinator sends the packed message to the appropriate TRS component via a rugged industrial grade communication link (e.g., the rugged industrial grade communication links 207, 250). At 335, the single point access coordinator waits for a response from the TRS component that the message was received.

At 340, the single point access coordinator determines whether a response was received from the TRS component. If a response is received, the process 300 proceeds to 345. If a response is not received, the process 300 proceeds to 360.

In some embodiments, when the user device is sending a message for the single point access coordinator, the single point access coordinator is not required to repack the message (325), send the message via a rugged industrial grade communication link (330), wait for a response (335), and/or determine whether a response was received (340). In these embodiments, the single point access coordinator generates a response and proceeds to 345.

At 345, the single point access coordinator packs the response into a commercial grade communication protocol (e.g., for Wi-Fi communication, infrared communication, Bluetooth communication, Zigbee communication, etc.). The packaged response can include, for example, what TRS component the response is from, the data length of the response, and the response itself. The single point access coordinator then sends the response to the user device at 350.

At 355, the single point access coordinator sends an improper message notification to the user device that the message sent by the user device was improper. In some embodiments, the notice sent to the user device can indicate the reason why the message was determined to be improper.

At 360, the single point access coordinator sends an improper response notification to the user device that a response was not received by the TRS component for which the message was intended.

Aspects:

It is appreciated that any of aspects 1-6, 7-13 and 14-20 can be combined.

1. A transport refrigeration system (TRS) comprising:
a refrigeration circuit;
one or more TRS components connected via an industrial grade communication link; and
a single point access coordinator connected to the one or more TRS components via the industrial grade communication link and connected to the refrigeration circuit, wherein the single point access coordinator is configured to communicate with an external device via a commercial grade communication link and configured to relay a message from the external device to an intended TRS component of the one or more TRS components via the industrial grade communication link.

2. The TRS of aspect 1, wherein the single point access coordinator is a TRS controller configured to control operation of the refrigeration circuit.

3. The TRS of any of aspects 1-2, wherein the one or more TRS components includes at least one of a human-machine interface, a telematics unit, a wireless personal area network (WPAN), and a data logger.

4. The TRS of any of aspects 1-3, wherein the industrial grade communication link is at least one of a J1939 control area network (CAN) connection and a RS45 connection.

5. The TRS of any of aspects 1-4, wherein the commercial grade communication link is at least one of a universal serial bus (USB) communication link, a Wi-Fi data link, a Bluetooth data link and a Zigbee data link.

6. The TRS of any of aspects 1-5, wherein the single point access coordinator is configured to:
receive a message packed in a communication grade communication protocol from the external device via the commercial grade communication link;
unpack the message from the communication grade communication protocol;
determine the intended TRS component of the one or more TRS components for the message;
repack the message in an industrial grade communication protocol; and
send the message to the intended TRS component of the one or more TRS components via the industrial grade communication link.

7. A method of communication for a transport refrigeration system (TRS), the method comprising:
a single point access coordinator of the TRS receiving a message from a device external the TRS via a commercial grade communication link;
processing the message for communication within the TRS; and
sending the message to an intended TRS component of the TRS via an industrial grade communication link.

8. The method of aspect 7, wherein processing the message for communication within the TRS includes:

unpacking the message from a commercial grade communication protocol;
determining an intended TRS component of the TRS for receiving the message; and
packing the message into an industrial grade communication protocol.

9. The method of any of aspects 7-8, further comprising the single point access coordinator determining whether the message is a proper message; and
notifying the device that the message is improper when the single point access coordinator determines that the message is not a proper message.

10. The method of any of aspects 7-9, further comprising:
the single point access coordinator waiting for a response from the intended TRS component via the industrial grade communication link after sending the message to the intended TRS component;
sending the response from the intended TRS component to the device via the commercial grade communication link.

11. The method of aspect 10, further comprising notifying the device that a response was not received when the response is not received by the single point access coordinator.

12. The method of any of aspects 7-11, wherein the single point access coordinator is a TRS controller, the TRS controller controlling operation of a refrigeration circuit of the TRS.

13. The method of any of aspects 7-12, wherein the intended TRS component is one of a human-machine interface, a telematics unit, a wireless personal area network (WPAN), and a data logger.

14. A single point communication system comprising:
a transport refrigeration system (TRS) including:
a refrigeration circuit,
one or more TRS components connected via an industrial grade communication link, and
a single point access coordinator connected to the one or more TRS components via the industrial grade communication link and connected to the refrigeration circuit;
a user device external to the TRS, the user device connected to the single point access coordinator via a commercial grade communication link,
wherein the single point access coordinator and the user device are configured to communicate via the commercial grade communication link, and
wherein the single point access coordinator is configured to relay a message from the user device to an intended TRS component of the one or more TRS components via the industrial grade communication link.

15. The single point communication system of aspect 14, wherein the single point access coordinator is a TRS controller configured to control operation of the refrigeration circuit.

16. The single point communication system of any of aspects 14-15, wherein the one or more TRS components includes at least one of a human-machine interface, a telematics unit, a wireless personal area network (WPAN), and a data logger.

17. The single point communication system of any of aspects 14-16, wherein the industrial grade communication link is at least one of a Jl939 control area network (CAN) connection and a RS45 connection.

18. The single point communication system of any of aspects 14-17, wherein the commercial grade communication link is at least one of a universal serial bus (USB) communication link, a Wi-Fi data link, a Bluetooth data link and a Zigbee data link.

19. The single point communication system of any of aspects 14-18, wherein the single point access coordinator is configured to:
receive a message packed in a communication grade communication protocol from the user device via the commercial grade communication link;
unpack the message from the communication grade communication protocol;
determine the intended TRS component of the one or more TRS components for the message;
repack the message in an industrial grade communication protocol; and
send the message to the intended TRS component of the one or more TRS components via the industrial grade communication link.

20. The single point communication system of any of aspects 14-19, wherein the user device is at least one of a personal computer, a smart phone, and a tablet computer.

While only certain features of the embodiments have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A transport refrigeration system (TRS) comprising:
a refrigeration circuit;
one or more TRS components connected via an industrial grade communication link; and
a single point access coordinator connected to the one or more TRS components via the industrial grade communication link and connected to the refrigeration circuit, wherein the single point access coordinator is configured to communicate with an external device via a commercial grade communication link and configured to relay a message from the external device to an intended TRS component of the one or more TRS components via the industrial grade communication link;
wherein the single point access coordinator is configured to:
receive a message packed in a communication grade communication protocol from the external device via the commercial grade communication link;
unpack the message from the communication grade communication protocol;
determine the intended TRS component of the one or more TRS components for the message;
repack the message in an industrial grade communication protocol; and
send the message to the intended TRS component of the one or more TRS components via the industrial grade communication link.

2. The TRS of claim 1, wherein the single point access coordinator is a TRS controller configured to control operation of the refrigeration circuit.

3. The TRS of claim 1, wherein the one or more TRS components includes at least one of a human-machine interface, a telematics unit, a wireless personal area network (WPAN), and a data logger.

4. The TRS of claim 1, wherein the industrial grade communication link is at least one of a Jl 939 control area network (CAN) connection and a RS45 connection.

5. The TRS of claim 1, wherein the commercial grade communication link is at least one of a universal serial bus (USB) communication link, a Wi-Fi data link, a Bluetooth data link and a Zigbee data link.

6. A method of communication for a transport refrigeration system (TRS), the method comprising:
a single point access coordinator of the TRS receiving a message from a device external the TRS via a commercial grade communication link;
processing the message for communication within the TRS; and
sending the message to an intended TRS component of the TRS via an industrial grade communication link;
wherein processing the message for communication within the TRS includes:
unpacking the message from a commercial grade communication protocol;
determining an intended TRS component of the TRS for receiving the message; and
packing the message into an industrial grade communication protocol.

7. The method of claim 6, further comprising the single point access coordinator determining whether the message is a proper message; and
notifying the device that the message is improper when the single point access coordinator determines that the message is not a proper message.

8. The method of claim 6, further comprising:
the single point access coordinator waiting for a response from the intended TRS component via the industrial grade communication link after sending the message to the intended TRS component;
sending the response from the intended TRS component to the device via the commercial grade communication link.

9. The method of claim 8, further comprising notifying the device that a response was not received when the response is not received by the single point access coordinator.

10. The method of claim 6, wherein the single point access coordinator is a TRS controller, the TRS controller controlling operation of a refrigeration circuit of the TRS.

11. The method of claim 6, wherein the intended TRS component is one of a human-machine interface, a telematics unit, a wireless personal area network (WPAN), and a data logger.

12. A single point communication system comprising:
a transport refrigeration system (TRS) including:
a refrigeration circuit,
one or more TRS components connected via an industrial grade communication link, and
a single point access coordinator connected to the one or more TRS components via the industrial grade communication link and connected to the refrigeration circuit;
a user device external to the TRS, the user device connected to the single point access coordinator via a commercial grade communication link,
wherein the single point access coordinator and the user device are configured to communicate via the commercial grade communication link, and
wherein the single point access coordinator is configured to relay a message from the user device to an intended TRS component of the one or more TRS components via the industrial grade communication link;
wherein the single point access coordinator is configured to:
receive a message packed in a communication grade communication protocol from the user device via the commercial grade communication link;
unpack the message from the communication grade communication protocol;
determine the intended TRS component of the one or more TRS components for the message;
repack the message in an industrial grade communication protocol; and
send the message to the intended TRS component of the one or more TRS components via the industrial grade communication link.

13. The single point communication system of claim 12, wherein the single point access coordinator is a TRS controller configured to control operation of the refrigeration circuit.

14. The single point communication system of claim 12, wherein the one or more TRS components includes at least one of a human-machine interface, a telematics unit, a wireless personal area network (WPAN), and a data logger.

15. The single point communication system of claim 12, wherein the industrial grade communication link is at least one of a J1 939 control area network (CAN) connection and a RS45 connection.

16. The single point communication system of claim 12, wherein the commercial grade communication link is at least one of a universal serial bus (USB) communication link, a Wi-Fi data link, a Bluetooth data link and a Zigbee data link.

17. The single point communication system of claim 12, wherein the user device is at least one of a personal computer, a smart phone, and a tablet computer.

* * * * *